Figure 1:
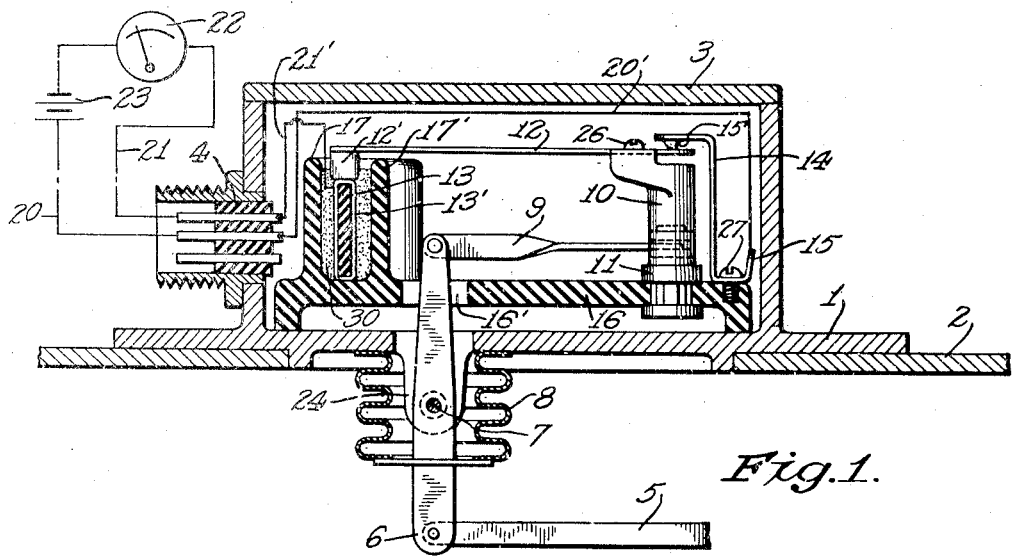

May 3, 1949.  C. A. DE GIERS  2,469,105

WEATHERPROOF TRANSMITTER RESISTOR DEVICE

Filed Nov. 21, 1945

INVENTOR.
Clarence A. de Giers
BY
Ernest D. Given
ATTORNEY

Patented May 3, 1949

2,469,105

UNITED STATES PATENT OFFICE 2,469,105

WEATHERPROOF TRANSMITTER RESISTOR DEVICE

Clarence A. de Giers, Forest Hills, N. Y., assignor to The Liquidometer Corporation, Long Island City, N. Y., a corporation of Delaware Application November 21, 1945, Serial No. 629,995

4 Claims. (Cl. 201—56)

This invention relates to electrical measuring devices in which a transmitter transmits signals electrically to a receiver, and has particular reference to the transmitters of measuring devices of the type above described which are exposed to varying atmospheric and weather conditions such as, for example, the transmitters of liquid level gauges employed on aircraft.

Practical experience shows that it is virtually impossible to protect transmitters of conventional design completely against the influence of changing atmospheric and weather conditions. As a result of temperature and pressure changes, moisture will be drawn into the transmitter housing and condensed therein. This moisture will cause corrosion and short circuits of electrical parts of the transmitter. When the transmitter is employed on aircraft, the change in altitude during the normal course of operation of the aircraft will cause marked changes in atmospheric pressure and temperature surrounding the transmitter housing. As a result, the housing will "breathe" through openings therein to equalize the pressure inside the housing with that outside. This breathing, combined with the temperature variations that result from compressing and extending the air and the temperature variations impressed from the outside, result in depositing condensed moisture within the housing. Consequently, the moisture problem is considerably aggravated, frequently to a point where no design of equipment hitherto known in the art can be considered as permanently reliable without servicing and frequent inspection. Such servicing and inspections usually require opening the transmitter housing which is not only inconvenient but often results in an upsetting of the delicate adjustment of the instrument.

Accordingly, it is one of the objects of the invention to provide a novel and improved transmitter for a measuring device of the type above described which is fully protected against the damaging effect of an intrusion of moisture.

Another object of the invention is to provide a novel and improved transmitter requiring little if any servicing and inspection as the result of intrusion of moisture into the transmitter housing.

Another object of the invention is to provide a novel and improved design of a transmitter which does not permit moisture to reach such electrical contacts and other parts of the transmitter as are protected according to the invention.

Another object of the invention is to provide a novel and improved transmitter in which friction between the moving parts thereof is considerably reduced, thereby eliminating any substantial wear of moving parts.

Another object of the invention is to provide a novel and improved transmitter in which the possibility of corona effects due to reduced air pressure caused, for instance, by high altitudes is practically eliminated.

Other and further objects, features and advantages of the invention will be hereinafter set forth and the novel features thereof defined by the appended claims.

In the accompanying drawing a now preferred embodiment of the invention is shown by way of illustration and not by way of limitation.

In the drawings.

Figure 2:
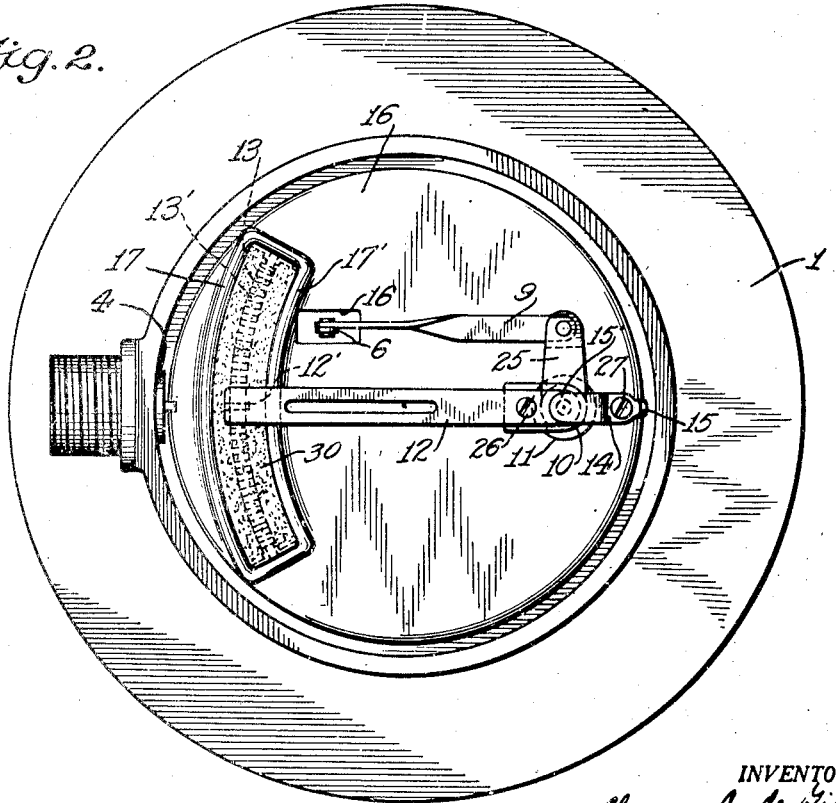

Fig. 1 shows an elevational sectional view of a transmitter according to the invention, and Fig. 2 is a plan view of Fig. 1, the housing cover of the transmitter being removed.

The figures show a transmitter of the resistance type. The resistance value of the resistor of the transmitter is controlled by a prime mover, which in turn is controlled by changes of the variable physical magnitude to be supervised, for instance by the change of the level of a liquid contained in a tank such as the fuel tank of an aircraft. The variable resistor of the transmitter is connected in circuit through a source of current with the receiving unit of a measuring instrument such as, for example, a milliammeter, which is responsive to and controlled by the resistance value of the transmitter resistor. The receiving unit of the measuring device may be located at any desired remote observation point. It is not known and described in detail, as instruments of the kind are in common use.

Referring now to the drawing in detail, the transmitter includes a flanged metal enclosure or housing 1 designed for attachment by any suitable means (not shown) to the walls of a tank 2, which may be a fuel tank of an airplane. The housing is closed by a cover 3, which is removably secured in any desired way over the housing. An electrical connector block 4 of standard design is mounted in an opening in the housing 1 for connecting the internal parts of the transmitter to the wires 20 and 21 leading to the terminals of the indicating instrument 22 and including in the circuit a source of current such as a battery 23. The instrument 22 may be calibrated in suitable units of the variable physical magnitude which is to be supervised, such as gallons or pounds of gasoline. In practice, more complicated circuits may of course be used. The resistance value of the transmitter resistor, which will be more fully described hereinafter, is controlled by means of a prime mover indicated by a link 5. This link may be operatively coupled with the float of a float system, the float resting on the liquid level to be supervised and causing a substantially axial movement of link 5 in either direction corresponding to a rise or fall of the liquid level. Float and linkage systems of this type are well known to persons skilled in the art and need not be described in detail. The link 5 is pivotally connected to a lever 6 pivoted at 7 in a bracket 24 fastened to or integral with the housing 1. A seal 8 of the bellows type separates the space within housing 1 from the space within tank 2, at the same time permitting, due to its inherent flexibility, a rocking movement of the lever 6 about the pivot 7 in response to a substantially axial displacement of link 5. A link 9 is pivotally connected to the lever 6. The other end of the lever 9 is connected to a crank arm 25, which is fastened to or formed on a hub 10, this hub being pivotally supported on a post 11 fastened to an insulation member 16, preferably a casting, rigidly held in position in the enclosure 1 by suitable fastening means (not shown). The insulation member 16 has an opening 16' long enough to permit the movements of the lever 6 previously mentioned.

The hub 10 which is preferably molded of insulating material, such as a plastic, is constructed at its upper end to form a seat which supports a slider arm 12 fastened in position by means of a screw 26. The outer end of the slider arm is formed to closely engage an arcuate resistance strip 13 one end of which is connected by a wire 21' to the wire 21. The resistance strip 13 is wound on a suitably shaped insulation carrier 13'. The inner end of the slider arm 12 engages a contact arm 14, which is fastened by a screw 27 to the insulation member 16. A terminal lug 15 on the arm 14 is connected by a wire 20' through the connector 4 to the wire 20. The slider arm 12 and the contact arm 14 are preferably made of an elastic metal to secure sufficient contact pressure between the engaging parts. It should be noted that the center of rotation of the slider arm 12 upon the rotation of hub 10 is coaxial with the axes of hub 10 and post 11. Friction between the slider 12 and the contact arm 14 may be reduced by a projection 15' on the underside of the arm engaging the slider at said center of rotation.

Insulation member 16 has two walls 17, 17' extending therefrom and connected at their ends to form a compartment in which is placed the resistance strip 13. The walls of the compartment extend beyond the upper edge of the resistance strip and a nose 12' on the slider arm 12 is within the compartment while sliding on the upper edge of resistance strip 13.

The compartment formed by walls 17, 17' is filled with a semi-solid or paste-like compound 30 having approximately the consistency of petroleum jelly and consisting of a high polymer, the molecular framework of which is essentially a structure of silicon atoms bound to each other by oxygen atoms. Compounds of this nature have excellent electrical insulating properties, great thermal stability, are moisture repellent and are not volatile. Furthermore, such compounds will retain approximately the same viscosity within the extreme range of temperature to which aircraft is exposed in the normal course of operation; they are non-toxic; they have good lubricating and wetting properties and they will adhere to surfaces, both metallic and non-metallic, with which they are brought in contact. Compounds of the type above described are known in the art and commercially available under the name "Silicone compound No. 7." The compounds are fully described in an article by R. W. Kolderman published in "Canadian Chemistry and Process Industries" issue of March, 1945, and also in a number of issued patents.

In operation, a substantially axial movement imparted to the link 5 in response to a liquid level change will cause a rocking movement of the lever 6 about the pivot 7. This movement will be transmitted to the crank arm 25 through the link 9 and will cause a corresponding rotation of hub 10 about the stationary post 11 and hence a displacement of the slider arm 12 on the resistance strip 13, which will influence the indications of instrument 22 correspondingly as previously explained, so that the indications of instrument 22 are always a function of the axial displacement of link 5.

Due to the relatively high viscosity of the compound 30, the resilient slider arm 12, when moved on resistance strip 13 in response to a displacement of link 5, will force the nose 12' on the arm through the compound thereby removing enough of it to permit electrical contact with the resistance strip; but not sufficient to permit moisture to reach the surface of the resistance strip to an appreciable extent. Consequently, moisture or moisture-laden air cannot come in contact with moving parts in electrical engagement for an appreciable length of time.

In the previous description it has been stated that the compound fills the compartment formed in part by walls 17, 17'. However, it should be noted that it is quite practical and often advantageous to fill substantially the entire housing with the compound and under pressure if desirable. Then, moisture is positively prevented from coming in contact with any of the transmitter parts mounted within housing 1 as moisture cannot enter the housing to any substantial extent.

The use of the viscous compound, non-miscible with water, occupying all or part of the space in the transmitter housing normally allowed for air, eliminates or diminishes the breathing effect as previously explained, thus removing the main cause of condensation within the housing. Furthermore, such condensation as may occur will deposit itself upon the surface of the viscous compound, and will not be permitted to move about within the housing. Thus it cannot reach any of the electrical components of the transmitter protected by the compound. Due to the non-toxic properties and the paste-like consistency of the compound, an attendant can open the housing for inspection and servicing without danger to himself or danger of spilling part of the compound. As previously mentioned, compounds of the type described have lubricating properties. Consequently, wear and friction at and between moving parts are reduced to a minimum. The insulating properties of the compound, which constitutes, in effect, a heavy layer of insulating material will result in a suppression or elimination of corona effects due to reduced air pressure at high altitudes.

While the invention has been described in detail with respect to a certain now preferred example and embodiment of the invention it will be apparent to those skilled in the art after understanding the invention, that various changes and modifications as to the compound and the transmitter design may be made without departing from the spirit and scope of the invention and it is intended, therefore, to cover all such changes and modifications in the appended claims.

What is claimed is:

1. In a transmitter for a measuring device of the type described for measuring a variable physical magnitude, the combination of a housing, an impedance means having two relatively movable members engaging each other mounted within the housing, the relative position of said members determining the impedance value of said impedance means, a prime mover controlled by said variable physical magnitude and operatively connected with one of said members for controlling the position thereof relative to the other member, and a moisture repellent and electrically insulating compound filling the housing in sufficient amount to cover at least one of the impedance members and the engaging portion of the other impedance member, said compound consisting of a high polymer with a frame work formed by a structure of silicon atoms bound to each other by oxygen atoms and having a semi-fluid consistency causing the compound to maintain the said one impedance member and the engaging portion of the other member completely covered while allowing for electrical contact between the impedance members as the same are moved relatively to each other.

2. In a transmitter for a measuring device of the type described for measuring a variable physical magnitude, the combination of a housing, an impedance means having two relatively movable members engaging each other mounted within the housing the relative position of said members determining the impedance value of said impedance means, a prime mover controlled by said variable physical magnitude and operatively connected with one of said members for controlling the position thereof relative to the other member, a member forming a compartment mounted within the housing, the other of said impedance members being placed in said compartment, and a moisture repellent and electrically insulating compound filling the compartment in sufficient amount to cover the impedance member placed in said compartment and the engaging portion of the other impedance member, said compound consisting of a high polymer with a frame work formed by a structure of silicon atoms bound to each other by oxygen atoms and having a semi-fluid consistency causing the compound to maintain the impedance member placed in said compartment and the engaging portion of the other member completely covered while allowing for electrical contact between the impedance members as the same are moved relatively to each other.

3. In a transmitter for a measuring device of the type described for measuring a variable physical magnitude, the combination of a housing, a resistor comprising a resistance element and a movable contact element engaging the resistance element, the relative position of said elements determining the effective resistance value of the resistor, a prime mover controlled by said variable physical magnitude and operatively connected with the movable contact element for controlling the position thereof relative to the resistance element, an insulation member forming a compartment mounted within the housing, the resistance element being placed in said compartment, and a moisture repellent and electrical insulating compound filling the compartment in sufficient amount to cover at least the resistance element and the engaging portion of the contact element, said compound consisting of a high polymer with a frame work formed by a structure of silicon atoms bound to each other by oxygen atoms and having a semi-fluid consistency causing the compound to maintain the resistance element and the engaging portion of the contact element completely covered while allowing for electrical contact between said elements as the same are moved relatively to each other.

4. In a transmitter for a measuring device of the type described for measuring a variable physical magnitude, the combination of a housing, a resistor comprising a resistance element and a contact element slidably engaging the resistance element, the relative position of said elements determining the effective resistance value of said resistor, a prime mover controlled by said variable magnitude and operatively connected with the slider contact for controlling the position thereof relative to the resistance element, an insulation member supporting the resistance element and the slider contact mounted within the housing, extensions provided at the insulation member for forming a compartment, the resistance element being placed in said compartment, and a moisture repellent and electrically insulating compound filling the compartment in sufficient amount to cover the resistance element and the engaging portion of the contact element, said compound consisting of a high polymer with a frame work formed by a structure of silicon atoms bound to each other by oxygen atoms and having a semi-fluid consistency causing the compound to maintain the resistance element and the engaging portion of the contact element completely covered while allowing for electrical contact between said elements while the same are moved relatively to each other.

CLARENCE DE GIERS.

REFERENCES CITED

The following references are of record in the file of this patent:

UNITED STATES PATENTS

| Number | Name | Date |
| --- | --- | --- |
| 891,833 | Gerry | June 30, 1908 |
| 2,021,487 | McDonell et al. | Nov. 19, 1935 |
| 2,035,707 | King | Mar. 31, 1936 |
| 2,104,898 | De Giers | Jan. 11, 1938 |
| 2,373,292 | Clason | Apr. 10, 1945 |

Certificate of Correction

Patent No. 2,469,105.

May 3, 1949.

CLARENCE A. DE GIERS

It is hereby certified that errors appear in the printed specification of the above numbered patent requiring correction as follows:

Column 1, line 27, for the word "extending" read *expanding*; column 3, line 20, for "lever", second occurrence, read *link*;

and that the said Letters Patent should be read with these corrections therein that the same may conform to the record of the case in the Patent Office.

Signed and sealed this 18th day of October, A. D. 1949.

[SEAL]

THOMAS F. MURPHY,
*Assistant Commissioner of Patents.*